United States Patent [19]

Gipp et al.

[11] Patent Number: 4,904,878
[45] Date of Patent: Feb. 27, 1990

[54] MULTI-POINT REFRACTIVE LIQUID LEVEL SENSOR

[75] Inventors: Gregory H. Gipp, Peoria; Jeffrey J. Riebschlager, Toluca, both of Ill.

[73] Assignee: Caterpillar Inc., Peoria, Ill.

[21] Appl. No.: 231,328

[22] Filed: Aug. 12, 1988

[51] Int. Cl.⁴ .................. G01F 23/00; G01N 21/00
[52] U.S. Cl. ......................... 250/577; 73/293
[58] Field of Search .................. 250/577; 73/293; 340/618, 619

[56] References Cited

U.S. PATENT DOCUMENTS

| | | |
|---|---|---|
| 3,995,169 | 11/1976 | Oddon . |
| 4,069,838 | 1/1978 | Hansel et al. . |
| 4,119,860 | 10/1978 | Gooley ........................... 250/577 |
| 4,193,004 | 3/1980 | Lobdell et al. .................. 250/577 |
| 4,201,914 | 5/1980 | Perren . |
| 4,270,049 | 5/1981 | Tanaka et al. . |
| 4,286,464 | 9/1981 | Tauber et al. .................. 73/293 |
| 4,311,048 | 1/1982 | Merz . |
| 4,354,180 | 10/1982 | Harding . |
| 4,468,567 | 8/1984 | Sasano et al. . |
| 4,680,475 | 7/1987 | Tansony et al. ................. 3650/577 |
| 4,711,126 | 12/1987 | Houpt et al. . |
| 4,745,929 | 5/1988 | Silver ............................. 250/577 |

Primary Examiner—Edward P. Westin
Attorney, Agent, or Firm—Robert E. Muir

[57] ABSTRACT

An apparatus is used for sensing liquid level in a vessel at multiple levels and with variable resolution using optical properties. Known electrical optical sensing devices are not adequate for applications where multiple level, fine or variable resolution sensing are desired. The subject liquid level sensor includes a mounting apparatus adapted for insertion into the vessel, for containing the electric circuit, and for filtering the liquid entering the sensor. In addition, the sensor includes an array of sensing elements electrically connected in parallel and attached along the mounting apparatus spaced from one another at preselected locations. The sensing elements are adapted to deliver a plurality of electric signals in response to the absence of liquid at the level of the respective sensing element. The electric signals are then summed by an amplifier, which then delivers a resultant liquid level signal.

14 Claims, 3 Drawing Sheets

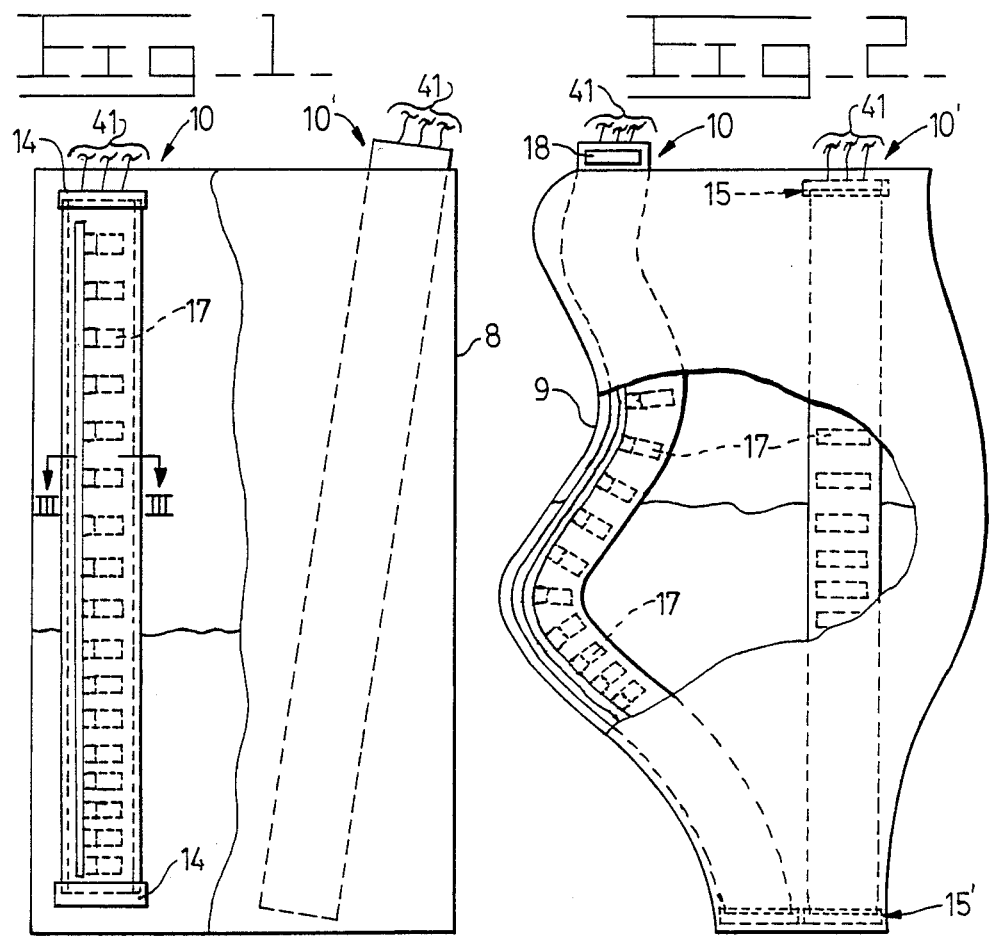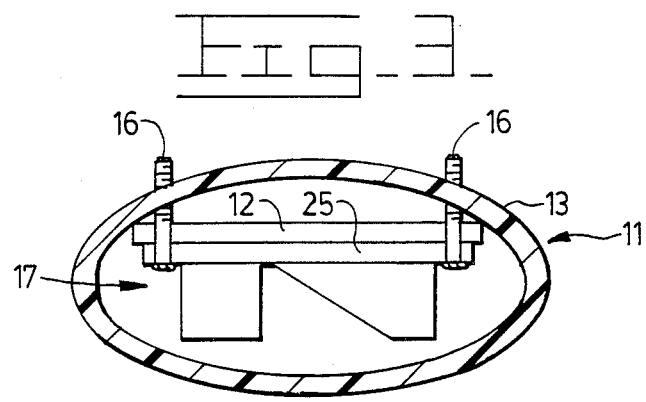

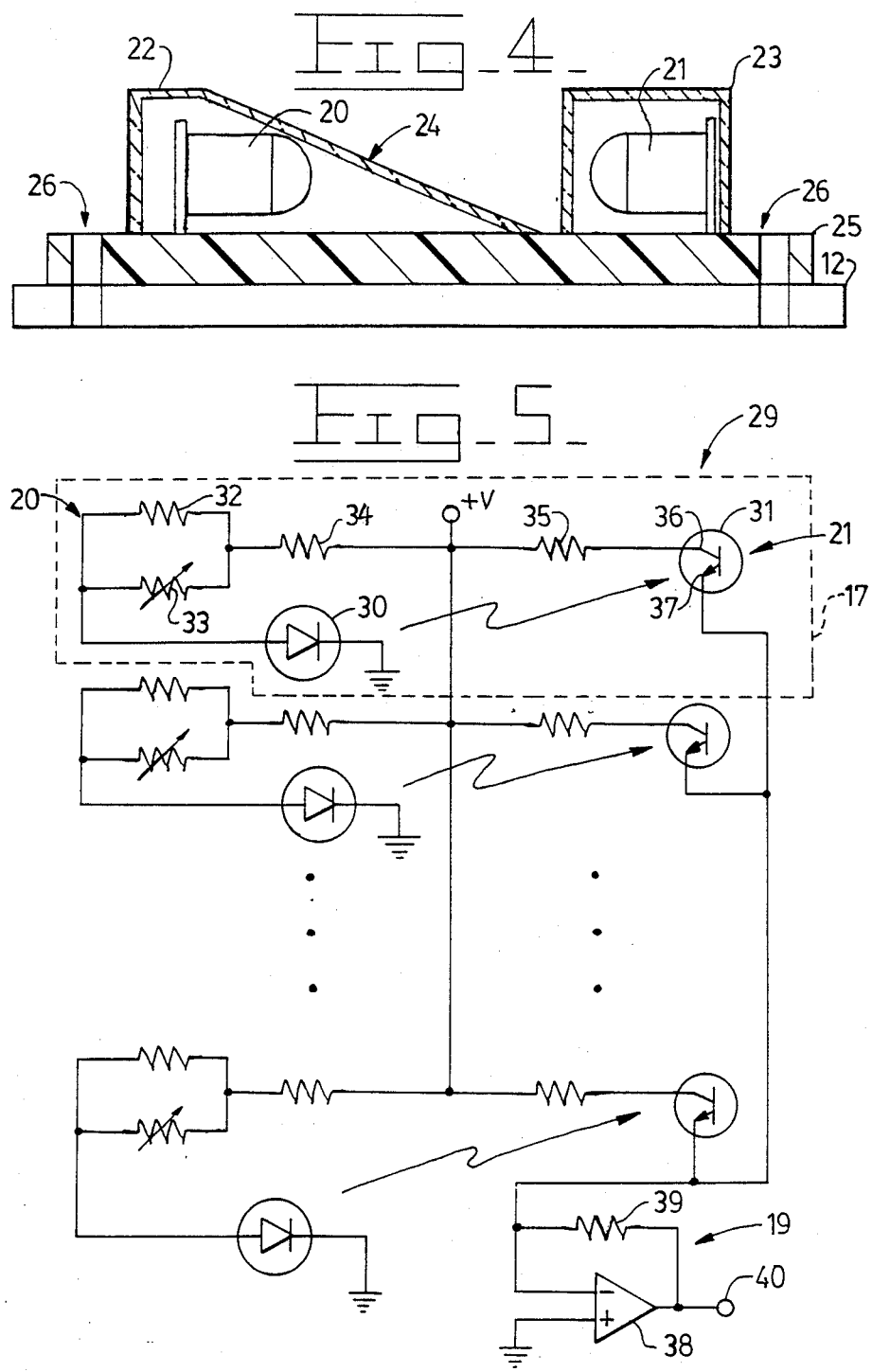

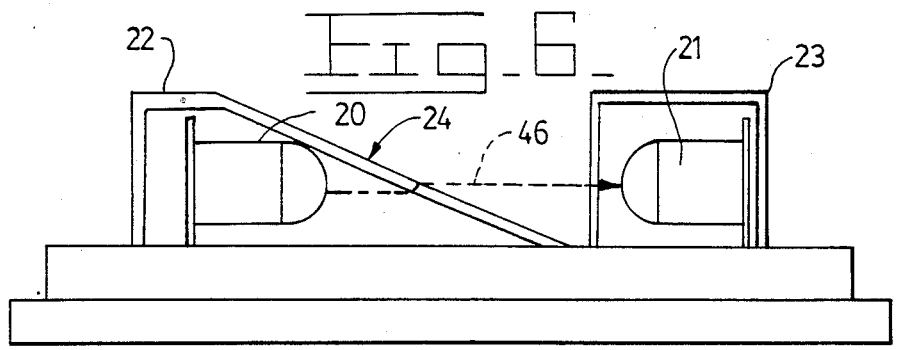
Fig_6_
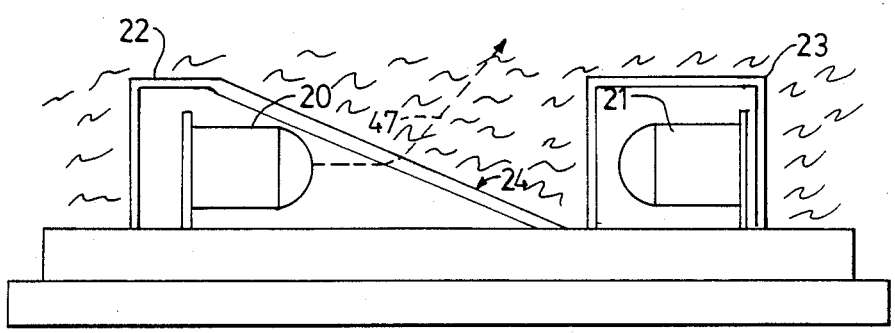
Fig_7_
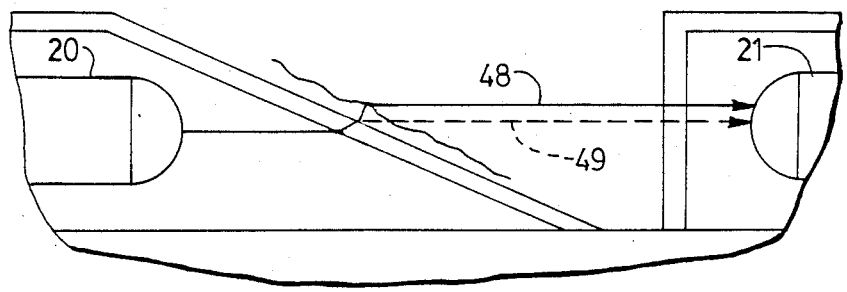
Fig_8_

MULTI-POINT REFRACTIVE LIQUID LEVEL SENSOR

TECHNICAL FIELD

This invention relates generally to an apparatus for sensing liquid level in a vessel and more particularly, to a multi-point liquid level sensor using optical properties for monitoring the liquid level in a vessel.

BACKGROUND ART

Electrical optical sensing devices are well known in the field of liquid level sensors. They generally employ reflective and refractive optical theory based on the different indices of refraction between two media.

One such sensor is described in U.S. Pat. 4,711,126, which issued to Houpt et al. on Dec. 8, 1987. Houpt teaches a Y-shaped light probe having a single light source at one arm of the Y, and a single light detector at the other. The wall of the probe is coated with a reflective material, preferably gold, with windows in the form of thin rings cut out in the reflective material. As the light travels from the light source to the bottom of the sensor, and reflects back to the detector, some of the light is lost through the windows to the outside liquid by refraction. The liquid level is determined by the amount of light that reflects and travels back to the detector. Houpt's sensor has several disadvantages. It is costly to make, requiring gold coating of the entire probe, and milling to achieve thin window cutouts in the gold coating. Another disadvantage is that this sensor gives false readings if a thin film of liquid forms on the exterior of the probe, covers some or all of the window slits which causes the light rays to refract out of the probe and into the liquid inaccurately. A similar fault is also encountered if contaminants and impurities in the liquid attach to the probe which can affect the amount of light returning to the detector. Sensors of this type are also not practical for liquid level sensing in relatively deep tanks. On the contrary, the instant invention employs refractive and transmissive properties of optics, and does not require coating of the sensor for reflective purposes. Unlike Houpt's liquid level sensor, which requires recoating and remilling the sensor probe, the present invention is easy to modify to adapt to changing applications.

Another optical liquid level sensor is described in U.S. Pat. 3,995,169, issued to Oddon on Nov. 30, 1976. This invention teaches a sensor consisting of a plurality of U-shaped light pipes of various length, each with a light source and a light detector at respective ends of the pipe. The geometry and construction of the pipe is such that the light reflects back to the detector end if liquid is not present at the U bend of the pipe, and refracts out of the pipe if liquid is present. This liquid level sensor is good for reasonably deep tanks and is less expensive, but it still has some serious drawbacks. The light pipes are not of ruqged construction, are bulky and cumbersome, and the number of liqht pipes one can have in the sensor is limited. Therefore, sensors of this type is good only for coarse measurements and not for liquid level sensing of fine resolution. This sensor also has the same problem as Houpt's sensor in that the sensor would give false levels if liquid or impurities and contaminants attach to the pipes. The instant invention overcomes the aforementioned disadvantages. The multi-point sensor is of more rugged construction and more compact. Having an array of sensing elements, with their outputs connected in parallel to a single node, the instant invention can monitor liquid level to fine resolution.

In the U.S. Pat. 4,354,180 issued to Harding on Oct. 12, 1982, an electro-optical liquid level sensor is described. Harding teaches a sensor also of probe type configuration, using reflection or refraction of a light beam to determine the liquid level. This sensor detects only at a single level, usually for maximum level or minimum level indication, rather than multi-point liquid level monitoring capability of the present invention.

Each of the above identified electrical optical liquid level sensors and others in the field is adequate in only certain situations, but has serious pitfalls in the applications to which the instant invention is directed. The present invention is directed to overcome the problems as set forth above.

DISCLOSURE OF THE INVENTION

The object of the invention is to avoid the disadvantages of said known sensors and to provide an inexpensive multi-point electrical liquid level sensor using transmissive and refractive optical properties that enables accurate monitoring of liquid levels and is of compact construction.

In one aspect of the invention, the apparatus for sensing liquid level in a vessel includes a mounting apparatus adapted for insertion into the vessel. In addition, the apparatus includes an array of sensing elements electrically connected in parallel and attached along the mounting apparatus. Each sensing element is spaced from one another at preselected locations along the mounting means. The sensing elements are adapted to deliver a plurality of electric signals in response to the absence of liquid at the level of the respective sensing element. The electric signals are received and processed by a processing means, which then delivers a resultant liquid level signal in response.

The instant invention provides multi-point liquid level sensing and is simple in construction, has no moving parts, and low in manufacturing cost. The invention also includes other features and advantages which will become apparent from a more detailed study of the drawings and specification.

BRIEF DESCRIPTION OF THE DRAWINGS

For a better understanding of the present invention, reference may be made to the accompanying drawings, in which:

FIG. 1 is a side view with a partial cut away of a vessel with two differently oriented multi-point liquid level sensors;

FIG. 2 is a side view with a partial cut away of an irregularly shaped vessel with two differently constructed multi-point liquid level sensors;

FIG. 3 is a cross-sectional view of the multi-point liquid level sensor taken along line III—III;

FIG. 4 is a cross-sectional side view of an example sensing element;

FIG. 5 is a schematic representation of the electric circuit of the liquid level sensor;

FIG. 6 and 7 are side views illustrating the operation of one of the sensing elements;

FIG. 8 is an enlarged partial side view illustrating the operation of a sensing element.

BEST MODE FOR CARRYING OUT THE INVENTION

Referring to FIG. 1, 2, various embodiments of the apparatus 10 for measuring liquid in vessels 8,9 is shown. The vessels 8,9 may contain liquids in a land or ocean-going vehicle (not shown) such as hydraulic oil, engine oil, coolant, diesel fuel, and gasoline. These vessels could be relatively deep, their contents caustic and at extreme temperatures. The shape and configuration of the vessels may vary greatly. FIG. 1 shows a rectangular vessel 8 and two sensor orientations. A liquid sensor 10 is attached to the wall of the vessel, in addition, another liquid sensor 10' is oriented at an angle for measurements of greater resolution. In most vehicles, space is conserved to achieve compactness. FIG. 2 shows a liquid level sensor attached along the wall of an irregularly shaped vessel 9 possibly constrained by the availability of space in the vehicle. The apparatus 10' is adaptable to the irregular shape by varying the resolution according to the cross sectional area of the vessel. Presently referring to FIG. 3, where a cross-sectional view of apparatus 10 is shown, the mounting apparatus 11 includes a printed circuit board 12, a tubular member 13, which preferably is elliptical in shape and encompasses the circuit board 12, and filtering means 14. Both the printed circuit board 12 and tubular means 13 may be made of flexible materials if mounting of the sensor along an irregularly shaped vessel wall is desired (see FIG. 2). The tubular member serves to dampen liquid oscillations within the liquid level sensor to make measurements less susceptible to transient disturbances. Tubular member 13 preferably has first and second open ends 15,15' each fitted with filtering means 14, including for example a fine mesh net. The filtering means prevents contaminants and impurities in the liquid from entering into the tubular member and disrupting the sensor's operation.

Positioned along the printed circuit board 12 is an array of sensing elements 17 electrically connected in parallel. The parallel connection will be more apparent in the electrical schematic representation in FIG. 5. The array of sensing elements are adapted to deliver an electric signal responsive to the absence of liquid at the level of the respective sensing element. The number and spacing between the sensing elements are predetermined according to application. Two factors are considered: the configuration of the vessel and the resolution desired. To better illustrate the construction of the liquid level sensor 10, an example will be used. A liquid level sensor will be fabricated for a fuel tank with a four feet sensing range. The upper three quarters of the range resolution desired is four inches, but the bottom quarter of the range resolution needs to be two inches. The resultant apparatus would have a total of fifteen sensing elements, with six sensor elements two inches apart at the bottom of the vessel, and nine sensor elements four inches apart at the top three quarters of the vessel. It is easily seen that the printed circuit board 12 can be custom made for a particular vessel and application, or the circuit boards can be made from a single specification, and stuffed according to a particular application, omitting sensing elements and other electrical components where not required. Referring to FIG. 2, an additional sensing element 18 is shown located above the maximum liquid level for power fault detection. Because it is above the maximum level, it is always delivering an electric signal, thus power loss to the liquid level sensor is indicated by the absence of any electric signal.

Referring to FIG. 4, an embodiment of the sensing element 17 is shown. The sensing element 17 includes a radiant energy emitting means 20 adapted to deliver radiant energy toward a radiant energy detecting means 21. The emitting means 20 and the detecting means 21 are substantially optically aligned. Both the emitting means 20 and the detecting means 21 are enclosed and sealed respectively in a first transparent housing portion 22 and a second transparent housing portion 23 which are both mounted on a base board 25. The first and second housing portions 22,23 are at a distance apart and bonded to the base board 25 which is thereafter attached to the circuit board 12. The first housing portion 22 has an angled side 24 facing the detecting means 21 that is oriented about 60° from the perpendicular to the plane of the base board 25. However, the magnitude of this angle is dependent on the indices of refraction of the liquid being measured and of the material of the housing portions and can be modified accordingly as is known in the art. This transparent angled side constitutes the crucial surface where the radiant energy strikes, and either passes through and along a substantially straight path to the detecting means, or refracts away from the detecting means at an angle predicted by Snell's Law. Mounting holes 26 may be drilled along the edge of the circuit board 12 for securing to the vessel wall by fasteners 16.

The material of the sensor housings 22,23 can be of any transparent acrylic, extruded glass or plastic, with an index of refraction less than 1.75. The preferred material is polyetherimide manufactured by General Electric and sold under the name ULTEM. The thickness of the housing walls should be less than 60/1000", but could be adjusted depending on the index of refraction of the material used. Similarly the angle of the housing wall 24 can be increased or decreased depending on the refraction index of the material used for the housings according to Snell's Law. The base board 25 can be bonded to the housings 22,23 by methods known in the art such as for example chemical or ultrasound, and create a liquid tight seal around the radiant energy emitting means 20 and detecting means 21.

Referring next to FIG. 5, an electrical schematic representation of the apparatus 10 is shown. The electrical paths and components of circuit 29 are contained on the printed circuit board 12. This embodiment shows the preferred electrical components and connections presently known, and this invention shall include any modifications of the electrical circuit that does not depart from the spirit of the invention. The circuit 29 includes a plurality of radiant energy emitting means 20 and radiant energy detecting means 21. Each radiant energy emitting means 20 includes a light emitting diode (LED) 30 connected to a supply voltage through parallel resistor 32 and thermistor 33 and a series resistor 34. The resistors 32,34 and thermistor 33 are used for temperature compensation to maintain constant output power from the LED. The radiant energy detecting means 21 delivers an electric signal in response to receiving radiant energy from the emitting means 20. The radiant energy detecting means 21 includes a phototransistor 31 connected to the supply voltage at the collector terminal 36 through current limiting resistor 35. The light level of the LEDs and the phototransistor currents should be adjusted by varying the resistor (32,34,35) values so that the phototransistors are just entering saturation region when no liquid is present. Phototransistors, with their particular saturation properties, are used rather than photo detectors to eliminate errors caused by light reflected off the surface of the liquid. The plurality of phototransistor 31 emitter output terminals 37 are connected in parallel to a processing means 28 which includes an operational amplifier 38 with an output voltage regulating resistor 39 in the feedback loop. The amplifier 38 and the resistor 39 sums the currents from the phototransistors and delivers a voltage level at a node 40. Note that the sensing elements do not require multiplexing or interrogating. Also note that the apparatus 10 is a circuit that has only three input-/output lines 41, a supply voltage, a circuit ground, and the output voltage node 40 indicating the liquid level.

The light emitting diodes 30 and phototransistors 31 used in the circuit are commercially available. Examples for the phototransistors are OP640 for high temperatures and OP550 for lower temperature ranges which are manufactured by TRW Optron of Carrollton, Texas. TRW Optron also makes the OP123 light emitting diodes incorporated in this embodiment. Other similar optical components can be substituted without departing from the instant invention.

Presently referring to both FIG. 6 and 7 which illustrate the operation of a sensing element. In FIG. 6 the radiant energy from the radiant energy emitting means 20 travels in absence of liquid in a path indicated by the dashed arrow 46 to the detecting means 21. Some minor refraction may occur in the angled wall 24 of housing portion 22, but not enough to alter the path 46 significantly. In FIG. 7 the radiant energy from the radiant energy emitting means 20 travels in the presence of liquid in a path indicated by the dashed arrow 47. The radiant energy strikes the emitting means housing wall 24 at 30°, and exits the housing 22 in a refracted path 47 away from the detecting means 21. The angle of refraction of this path 47 is predicted by Snell's law as is known in the art.

FIG. 8 illustrates one of the advantages of the present invention over other liquid level sensors in the art. For most optical liquid level sensors relying on a light beam reflecting on surface and returning to a light detecting means, a thin film of liquid residue on the crucial reflection and refraction surface may result in inaccurate measurements. The light beam, meeting the thin film of liquid in its path, refracts into the liquid rather than reflect back to the light detecting means. This problem is overcome in the present invention. Referring to FIG. 8, in the event a thin film of liquid residue adhering to the outer surface of the wall 24 when liquid level is below the level of the sensing element, the radiant energy follows path 48. As shown in FIG. 8, although the radiant energy has refracted away from the intended path 49, the deviated radiant energy is sufficiently on track and is still received at the detecting means 21 via path 48.

INDUSTRIAL APPLICABILITY

The operation of the apparatus 10 is best described in relation to its use in the monitoring of liquids in vessels on various land or ocean-going vehicles. These containers could be relatively deep and irregularly shaped and their contents caustic and at extreme temperatures.

To illustrate the operations of the multi-point liquid level sensor, let us return to the previous example sensor. Recall that this liquid level sensor contains fifteen sensing elements. Now assume nine sensing elements are immersed in liquid. This is known from the voltage level at the output 40 of the sensor apparatus because the voltage level is proportional to the number of sensing elements not immersed in liquid. Knowing the resolution and the configuration of the sensing elements, the liquid level can be known to within four inches in this case, or within two inches when the level is below one quarter of the vessel. Accordingly, nine sensing elements immersed in liquid equates to twenty inches of liquid.

The multi-point liquid level sensor of the present invention is versatile. The oscillation in liquid level caused by large movements typical of work vehicles and boats can be compensated by time-averaging the resultant liquid level signal at node 40. This is accomplished by adding a capacitor in the feedback loop of the amplifier, as is known in the art. Furthermore, modification of the apparatus 10 is easy. Changing the number of sensing elements only requires changing the value of the resistor in the feedback loop. Similarly, the resolution of the sensor can be modified by adding or taking out sensing elements.

The liquid level information from the multipoint liquid level sensor may be relayed to a microprocessor on board the vehicle, which monitors system functions, or to a display at the operator panel. An audio or visual signal may be used to alert the operator for low or high levels.

Other aspects, objects, and advantages of this invention can be obtained from a study of the drawings, the disclosure, and the appended claims.

We claim:

1. An apparatus for sensing liquid level in a vessel, comprising:
    a mounting apparatus adapted for insertion into the vessel;
    an array of sensing elements electrically connected in parallel and positioned along said mounting apparatus, the sensing elements each being spaced from one another at preselected locations and each being adapted to deliver an electric signal responsive to absence of liquid at the level of the respective sensing element, each sensing element including radiant energy emitting means for producing radiant energy and radiant energy detecting means for delivering the electric signal responsive to received radiant energy;
    a first transparent housing portion mounted on said mounting apparatus encasing and sealing the respective radiant energy emitting means;
    a second transparent housing portion mounted on said mounting apparatus encasing and sealing the respective radiant energy detecting means;
    each radiant energy emitting means being directed generally toward the respective radiant energy detecting means, and each first housing portion being spaced from the second housing portion and having one side at an angle relative to said second housing portion; and
    processing means for receiving the plurality of electric signals, summing the received electric signals, and delivering a resultant liquid level signal in response thereto.

2. An apparatus, as set forth in claim 1, wherein the spacing between individual sensing elements varies correlative to variations in the configuration of the vessel.

3. An apparatus, as set forth in claim 1, wherein the spacing between individual sensing elements varies correlative to variations in the resolution of the apparatus.

4. An apparatus, as set forth in claim 1, wherein the mounting apparatus includes;
- a circuit board having the array of sensing elements and the plurality of first and second housing portions connected thereto;
- a tubular member having a first and a second open ends and being adapted to encompass the circuit board; and
- means for filtering the liquid entering the tubular member, the filtering means being secured to both the first and second openings of the tubular member.

5. An apparatus, as set forth in claim 1, wherein each sensing element includes;
- a light emitting diode disposed in the first housing portion;
- a phototransistor disposed in the second housing portion;
- means for maintaining substantially constant output power from the light emitting diode; and
- for maintaining substantially constant input current to the phototransistor, said light emitting diode and respective phototransistor being in optical alignment with one another.

6. An apparatus, as set forth in claim 5, wherein said light emitting diode delivers an optical beam which refracts away from the phototransistor in the presence of liquid, and transmits to the phototransistor in the absence of liquid, the phototransistor being adapted to deliver the electrical signal in response to receiving the optical beam in the absence of liquid.

7. An apparatus, as set forth in claim 1, wherein said angled side of first housing portion is oriented at an angle of substantially 60° to the perpendicular of the plane of the mounting apparatus.

8. An apparatus, as set forth in claim 1, said processing means for summing the received electric signals includes an amplifier and a feedback resistor.

9. An apparatus, as set forth in claim 1, wherein said array of sensing elements has at least one sensing element positioned at a preselected location above the maximum expected liquid level.

10. An apparatus, as set forth in claim 1, wherein said radiant energy refracts away from the detecting means at the angled side of the first housing portion in the presence of liquid, and transmits through the angled side to the detecting means in the absence of liquid, the detecting means being adapted to deliver the electrical signal in response to receiving the radiant energy in the absence of liquid.

11. An apparatus, as set forth in claim 10, wherein the mounting apparatus includes;
- a circuit board having the array of sensing elements and the plurality of first and second housing portions connected thereto; wherein each sensing element includes a light emitting diode disposed in the first housing portion; a phototransistor disposed in the second housing portion; wherein said light emitting diode delivers an optical beam which refracts away from the phototransistor in the presence of liquid, and transmits to the phototransistor in the absence of liquid, the phototransistor being adapted to deliver the electrical signal in response to receiving the optical beam in the absence of liquid; means for maintaining substantially constant output power from the light emitting diode; and means for maintaining substantially constant input current to the phototransistor, said light emitting diode and respective phototransistor being in optical alignment with one another;
- a tubular member having a first and a second open ends and being adapted to encompass the circuit board; and
- means for filtering the liquid entering the tubular member, the filtering means being secured to both the first and second openings of the tubular member.

12. An apparatus, as set forth in claim 11, wherein
- said array of sensing elements has at least one sensing element positioned at a preselected location above the maximum expected fluid level, wherein the spacing between individual sensing elements varies correlative to variations in the configuration of the vessel;
- said angled side of the first housing portion is at 60° to the perpendicular of the plane of the circuit board; and
- said processing means includes means for summing the plurality of electric signals and delivering the resultant liquid level signal in response thereto, said summation means including an operational amplifier.

13. An apparatus for sensing liquid level in a vessel, comprising:
- a mounting apparatus being adapted for insertion into the vessel;
- an array of sensing elements electrically connected in parallel and positioned along said mounting apparatus, the sensing elements each being spaced from one another at preselected locations and each being adapted to deliver an electric signal responsive to absence of liquid at the level of the respective sensing element wherein each sensing elements includes;
- radiant energy emitting means for producing radiant energy;
- radiant energy detecting means for delivering the electric signal responsive to received radiant energy;
- said radiant energy refracts away from the detecting means in the presence of liquid, and transmits to the detecting means in the absence of liquid, the detecting means adapted to deliver the electrical signal in response to receiving the radiant energy in the absence of liquid;
- means for summing the plurality of received electric signals and delivering a resultant liquid level signal in response thereto.

14. An apparatus for sensing liquid level with variable resolution in an irregularly shaped vessel, comprising:
- a strip of flexible printed circuit board adapted for inserting substantially vertically into the vessel and having a plurality of holes along the two longitudinal edges of the board for mounting the board to the vessel wall;
- a tubular member having a first and a second open ends, the tubular member being adapted to encompass the circuit board;
- means for filtering the liquid entering the tubular member, the filtering means being secured to both the first and second openings of the tubular member;

an array of sensing elements electrically connected in parallel and positioned along said printed circuit board, the sensing elements being in spaced relationship from one another to adapt to the irregular shape of the vessel, and capable of delivering a plurality of electric signals responsive to immersion of sensing elements in liquid, wherein each sensing element includes;

radiant energy emitting means for producing radiant energy;

radiant energy detecting means for delivering the electric signal responsive to received radiant energy;

said radiant energy emitting means being directed generally toward the respective detecting means, and the emitting and detecting means are in optical alignment with one another;

a first housing portion encasing and sealing the radiant energy emitting means and connected to the printed circuit board;

a second housing portion encasing and sealing the radiant energy detecting means and connected to the printed circuit board;

said first housing portion being spaced apart from the second housing portion and having one side at a positive angle to the plane of the circuit board, wherein the angled side is arranged to generally face the second housing;

said radiant energy refracts away from the detecting means at the angled side of the first housing portion in the presence of liquid, and transmits through the angled side to the detecting means in the absence of liquid, the detecting means being adapted to deliver the electrical signal in response to receiving the radiant energy in the absence of liquid; and means for summing the plurality of electric signals and delivering the resultant liquid level signal in response thereto.

\* \* \* \* \*

UNITED STATES PATENT AND TRADEMARK OFFICE
CERTIFICATE OF CORRECTION

PATENT NO. : 4,904,878

DATED : February 27, 1990

INVENTOR(S) : Gregory H. Gipp and Jeffrey J. Riebschlager

It is certified that error appears in the above-identified patent and that said Letters Patent is hereby corrected as shown below:

Claim 5, column 7, line 25, insert --means-- before "for".

Signed and Sealed this

Twenty-seventh Day of November, 1990

Attest:

HARRY F. MANBECK, JR.

*Attesting Officer*   *Commissioner of Patents and Trademarks*